US012004636B2

(12) United States Patent
Drew et al.

(10) Patent No.: US 12,004,636 B2
(45) Date of Patent: Jun. 11, 2024

(54) PORTABLE SELF-STANDING HAMMOCK FRAME WITH SHORTENED HAMMOCK AND METHOD FOR SUSPENDING SHORTENED HAMMOCK ON A FRAME

(71) Applicant: COCAM INTERNATIONAL ENTERPRISES LTD., Nanjing (CN)

(72) Inventors: Jason Drew, Shorewood, MN (US); Christopher Svensrud, Minneapolis, MN (US); Min Zhuang, Las Vegas, NV (US)

(73) Assignee: COCAM INTERNATIONAL ENTERPRISES LTD., Nanjing (CN)

( * ) Notice: Subject to any disclaimer, the term of this patent is extended or adjusted under 35 U.S.C. 154(b) by 60 days.

(21) Appl. No.: 17/550,466

(22) Filed: Dec. 14, 2021

(65) Prior Publication Data
US 2022/0175120 A1 Jun. 9, 2022

Related U.S. Application Data

(62) Division of application No. 16/501,068, filed on Feb. 15, 2019, now Pat. No. 11,213,113.
(Continued)

(51) Int. Cl.
*A45F 3/24* (2006.01)
*F16B 7/04* (2006.01)

(52) U.S. Cl.
CPC .............. *A45F 3/24* (2013.01); *F16B 7/048* (2013.01)

(58) Field of Classification Search
CPC ........ F16B 7/048; E04H 15/34; Y10T 403/34; Y10T 403/341; Y10T 403/342; Y10T 403/42

See application file for complete search history.

(56) References Cited

U.S. PATENT DOCUMENTS

| 2,581,623 A | 1/1952 | Benjamin |
| 2,646,577 A * | 7/1953 | Thayer .................. A47C 17/68 |
| | | 5/98.1 |

(Continued)

FOREIGN PATENT DOCUMENTS

| CN | 201200164 Y | 3/2009 |
| CN | 202069127 U | 12/2011 |

(Continued)

OTHER PUBLICATIONS

International Preliminary Report on Patentability and Written Opinion of the International Searching Authority for corresponding Application No. PCT/US2019/000005 dated Nov. 10, 2020.
(Continued)

*Primary Examiner* — Daniel J Wiley
(74) *Attorney, Agent, or Firm* — MILES & STOCKBRIDGE P.C.; David R. Schaffer (57) ABSTRACT

The present invention is generally directed to an end cap for use on a self-standing structural frame, for example, a self-standing framed hammock. The hammock includes: two end bars that connect the x-shaped frames; and at least one panel of fabric suspended between the two end bars of the x-shape; wherein the panel of fabric is gathered and distributed along an end bar that is fixed to the end caps, and wherein the panel of fabric has foam padding to cover the end bar. Wherein the corner end caps have the ability to attach additional frame parts and/or accessories to the frame, and wherein the feet are extended to have two points of ground contact and extend the width of the base footprint of the frame.

19 Claims, 13 Drawing Sheets

Related U.S. Application Data (60) Provisional application No. 62/762,579, filed on May 10, 2018.

(56) References Cited

U.S. PATENT DOCUMENTS

| | | | | |
|---|---|---|---|---|
| 2,711,180 | A * | 6/1955 | Sims | E04B 1/34326 |
| | | | | 135/160 |
| 2,818,875 | A * | 1/1958 | Denn | B23K 1/00 |
| | | | | 135/159 |
| 2,839,320 | A * | 6/1958 | Hill | F16B 7/0486 |
| | | | | D8/382 |
| 3,426,367 | A * | 2/1969 | Bradford | A61G 1/013 |
| | | | | 5/628 |
| 4,542,057 | A | 9/1985 | Breitscheidel et al. | |
| 4,558,713 | A * | 12/1985 | Hagler | E04H 15/34 |
| | | | | 135/159 |
| 4,648,734 | A * | 3/1987 | Daus, Jr. | E04H 15/34 |
| | | | | 403/170 |
| 4,679,840 | A | 7/1987 | Fry et al. | |
| 4,716,919 | A * | 1/1988 | Griffin | E04H 15/48 |
| | | | | 135/901 |
| 4,757,563 | A | 7/1988 | An | |
| 4,807,314 | A | 2/1989 | Fry et al. | |
| 4,877,288 | A | 10/1989 | Lee | |
| 5,097,546 | A | 3/1992 | Turner, III | |
| 5,113,537 | A | 5/1992 | Turk | |
| 5,261,436 | A * | 11/1993 | Funk | E04H 15/42 |
| | | | | 135/156 |
| 5,927,363 | A * | 7/1999 | Olsen | E04H 15/44 |
| | | | | 403/183 |
| 6,116,437 | A * | 9/2000 | Rowe | F28D 1/04 |
| | | | | 211/119.008 |
| 6,247,869 | B1 * | 6/2001 | Lichvar | F16L 47/00 |
| | | | | 403/403 |
| 6,263,895 | B1 * | 7/2001 | Bang | E04H 15/44 |
| | | | | 135/138 |
| 6,666,223 | B2 * | 12/2003 | Price | E04H 15/50 |
| | | | | 135/147 |
| 6,848,679 | B2 * | 2/2005 | Higgs | E04F 11/1812 |
| | | | | 403/205 |
| 7,063,481 | B2 * | 6/2006 | Trull | E04H 15/44 |
| | | | | 403/396 |
| 7,219,681 | B1 * | 5/2007 | Hamilton-Jones | E04H 15/44 |
| | | | | 135/123 |
| 7,725,965 | B2 | 6/2010 | Sanford-Schwentke | |
| 7,895,686 | B1 | 3/2011 | Chen | |
| 8,296,879 | B2 * | 10/2012 | Lin | A47C 17/72 |
| | | | | 5/112 |
| 8,745,782 | B2 | 6/2014 | Bernat | |
| 8,750,329 | B2 | 6/2014 | Chheda et al. | |
| 8,919,284 | B2 * | 12/2014 | Wolfe, Jr. | A01K 15/02 |
| | | | | 119/28.5 |
| 9,713,372 | B1 | 7/2017 | Chen | |
| 9,788,639 | B2 | 10/2017 | Frazer et al. | |
| 10,753,082 | B2 * | 8/2020 | Le | E04B 1/5825 |
| 2007/0079442 | A1 | 4/2007 | Stoll | |
| 2007/0277310 | A1 | 12/2007 | Sanford-Schwentke | |
| 2007/0295378 | A1 * | 12/2007 | Lapping | E04H 15/44 |
| | | | | 135/121 |
| 2009/0013472 | A1 | 1/2009 | Koffler et al. | |
| 2009/0266024 | A1 * | 10/2009 | de la Chevrotiere | E01D 6/00 |
| | | | | 52/655.1 |
| 2018/0000256 | A1 | 1/2018 | Saunders, Sr. | |
| 2018/0116379 | A1 | 5/2018 | Fenton | |

FOREIGN PATENT DOCUMENTS

| | | |
|---|---|---|
| FR | 1378609 A | 11/1964 |
| JP | 63392 | 4/1921 |
| JP | S52-39244 A | 3/1977 |
| KR | 20190010106 A | 1/2019 |
| RU | 2275830 C2 | 5/2006 |
| SU | 1621852 A1 | 1/1991 |

OTHER PUBLICATIONS

Official Action and Search Report with English translation dated Jun. 15, 2021 for corresponding Russian Application No. 2020140615.
Partial Supplementary European Search Report for corresponding EP Application No. 19799018.7 dated Nov. 9, 2021.
Notice of Allowance for corresponding MX Application No. MX/a/2020/011932 dated Oct. 29, 2021.
Official Notification w/English translation issued Nov. 16, 2021 in corresponding Russian patent application No. 2020140615.
Notification of Reasons for Refusal w/English translation mailed Dec. 10, 2021 for corresponding JP Application No. 2021-513753.
Combined Search and Examination Report issued in corresponding UK Application No. 2118963.4 on Jan. 21, 2022.
Any information that are not included with this Information Disclosure Statement can be found in U.S. Appl. No. 16/501,068.
Extended European search report (EESR) including the supplementary European search report and European search opinion issued in corresponding EP Application No. 19799018.7 on Feb. 11, 2022, pp. 2-14.
Technical Report issued Apr. 1, 2022 in corresponding Brazilian Application No. 1120200227064 by the Brazilian Instituto Nacional Da Propriedade Industrial (INPI), all pages.
U.S. Pat. No. 674,664 patented May 21, 1901, "Combined Folding Hammock and Reclining Rocking Chair", J.E. Bergsten, 5 pages.
Extended European Search Report dated Aug. 19, 2022 in corresponding European Application No. 22175989.7-1015, pp. 1-6.
Examination Report under Section 18(3) dated Jul. 19, 2022 in corresponding GB Application No. GB2118963.4, pp. 1-2.
Office action issued Aug. 3, 2023 in corresponding European Patent Application No. 19799018.7.
Extended European Search Report issued Aug. 30, 2023 in corresponding European Patent Application No. 22175982.2.
Examination Report issued Dec. 21, 2023 in corresponding European Application No. 19799018.7.

* cited by examiner

PORTABLE SELF-STANDING HAMMOCK FRAME WITH SHORTENED HAMMOCK AND METHOD FOR SUSPENDING SHORTENED HAMMOCK ON A FRAME

RELATED U.S. APPLICATION DATA

This application is a divisional of application Ser. No. 16/501,068, filed Feb. 15, 2019, now U.S. Pat. No. 11,213, 113, which claims priority benefit of U.S. Provisional Patent Application No. 62/762,579, filed May 10, 2018, and the entire content of both are hereby incorporated by reference herein in their entireties.

FIELD OF THE INVENTION

The present invention is generally directed to self-standing structural frames including a fabric that is suspended on the frames.

BACKGROUND OF THE INVENTION

There have been reports of various hammocks and related methods. For instance, U.S. Pat. No. 9,788,639, entitled "Protective Hammock Enclosure and Method of Use" is allegedly directed to the following: "A hammock enclosure designed for preferably one or two hammocks can be used in a variety of settings and locales due to a number of features of the enclosure. The hammock enclosure has sides made of a high quality netting to prevent insects from entering the enclosure. Additionally, an adjustable, water proof rain fly is positioned above the enclosure and the bottom of the enclosure also comprises a water proof material. The hammock enclosure is affixed, preferably to two trees, and the hammocks then hung inside. The lines for the hammocks pass through openings which may be cinched close to again prevent water, insects, and the like from entering the enclosure. Alternatively, the hammock enclosure may be secured to the ground via loops, an upper loop(s), and a securement mechanism. This enables the hammock enclosure to be utilized as a traditional ground shelter." Abstract.

U.S. Pat. No. 9,750,329, entitled "Multiple-Loop Support Strap and Method for Hanging a Hammock" supposedly reports the following: "A multiple-look support strap is adapted for hanging one end of a hammock from a fixed structure. The support strap cooperates with a like strap to hang an opposite end of the hammock from a second fixed structure spaced apart from the first. The support strap comprises an elongated length of flexible strap folded upon itself to form first and second overlying strap sections. The strap sections are integrally joined together at a first end of the support strap, and a least one of the first and second strap sections terminates at an opposite second end of the support strap. A plurality of strap loops are formed with the first and second strap sections between opposite ends of the support strap." Abstract.

U.S. Pat. No. 9,713,372, entitled "Rounded Hammock" reportedly discusses the following: "A rounded hammock includes a middle panel having a rounded profile and a center. At least four sidewalls, include a first sidewall, a second sidewall, a third sidewall, and a fourth sidewall connected to the middle panel. A first pleat is formed on the first sidewall. A second pleat is formed on the second sidewall. A third pleat is formed on the third sidewall. A fourth pleat is formed on the fourth sidewall. A first pleat cover is stitched over the first pleat. A second pleat cover is stitched over the second pleat. A third pleat cover is stitched over the third pleat. A fourth pleat cover is stitched over the fourth pleat." Abstract.

Despite the various reports, there is still a need in the art for novel hammocks and related methods.

SUMMARY OF THE INVENTION

In one aspect, the present invention provides a self-standing framed hammock. The hammock includes: two end bars that connect the main frame structures; and at least one panel of fabric suspended between the two end bars of the main frame structure; wherein the panel of fabric is gathered and distributed along an end bar that is fixed to the end caps, and wherein the panel of fabric has foam padding to cover the end bar.

In another aspect, the present invention provides a method of constructing a self-standing hammock. The method includes the following steps: gathering a hammock fabric and attaching it to end bars of a self-standing hammock frame; providing a foam pad; sewing an end of the hammock fabric to form a sleeve to slide over an end bar; assembling the foam pad around the end of the hammock fabric with a gap of approximately 1 inch of space between an end of the hammock fabric and an inside length of a foam pad.

In another aspect, the present invention provides a corner end cap that allows additional frame parts to be assembled onto the self-standing frame. The corner end cap includes at least one tube to receive additional frame parts that can be fiberglass and steel frame poles, as well as aluminum or other material frame poles. These additional frame parts can be used to assemble accessories such as but not limited to a mosquito net, tarp, full tent enclosure, single spine-line, or bracing poles. The corner end caps may also include a screw hole to attach additional accessories onto part. These screw-on parts include, but are not limited to, sun shade parts, securing parts, bracing poles, tent support poles, table surface, and lighting.

And yet another aspect, the present invention may include an extended foot that widens the base footprint to provide bracing and support for the hammock frame.

DETAILED DESCRIPTION OF THE INVENTION

Hammocks are well known as a furniture-like device for providing support for an individual to sit, recline, relax or sleep. Hammocks are typically made of fabric material that is at least 7 feet in length and rectangular in shape. This provides enough length to fit the majority of heights of humans within the hammock length. The material is gathered together along the two short ends and secured tightly gathered by some means such as a rope. A spreader bar is sometimes used to hold open the fabric material.

The present invention is a self-standing structural frame consisting of two sets of tubes that cross in an "x-like" shape and are connected together at the top with end bars. Hammock fabric can be suspended between these end bars and typically has the following characteristics: it is gathered together along the length of the end bar; it may be significantly shorter than traditional hammocks (e.g., less than 7 feet in length, less than 6 feet 8 inches in length, less than 6 feet 4 inches in length, or less than 6 feet in length); it has pads at either end that cover the end bars; it provides core body support but allows users to extend their legs off the end of the hammock fabric. The hammock frame can be collapsed, disassembled, or folded down to fit into a carry bag. The unique shape of the frame and suspended fabric lowers and centers the weight to allow for a stable base with a minimal footprint.

In one embodiment, the present invention provides a self-standing structural frame consisting of two sets of tubes that cross in an "x-like" shape is provided. The two sets of tubes are connected together at the top with end bars, which provide structure for the two x-frames and may detach from the frame tubes for collapsing. Hammock fabric is suspended between these end bars. The short side of the hammock fabric is sewn to form sleeve which is then assembled onto the end bar, and the fabric is gathered along the end bars. The end of the hammock fabric includes a foam pad to cover the end bar to allow the user to comfortably extend his legs beyond the end of the hammock frame. This foam pad provides a separate independent function of spreading the center of the hammock fabric open for easy entry.

Figure 1:
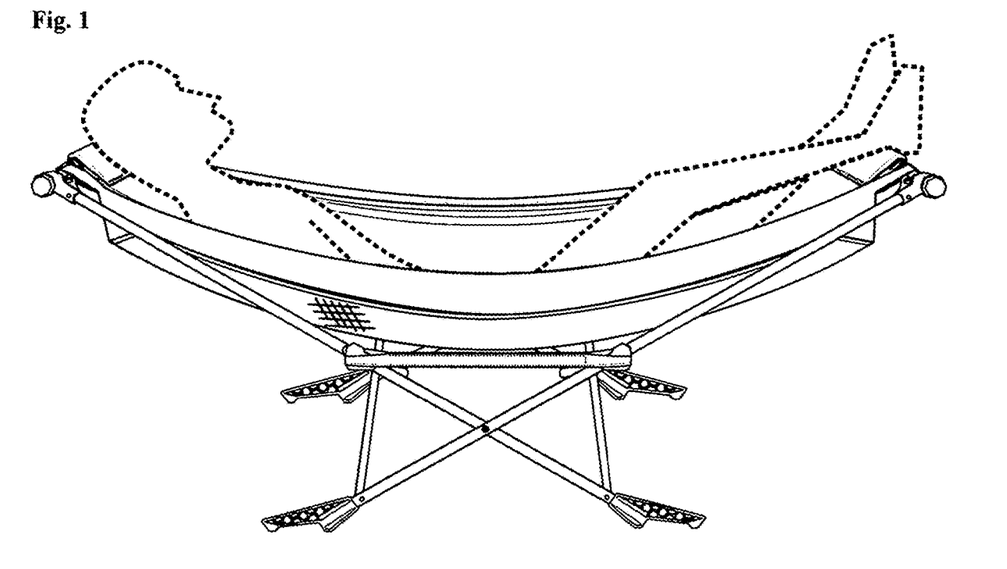
FIG. 1 is a front perspective view of an exemplary embodiment of the present invention in use.

FIG. 1 is a front perspective view of an exemplary embodiment of the present invention in use. As illustrated, the self-standing hammock frame suspends a shortened hammock, providing core body support but allowing users to extend their legs off the end of the hammock fabric.

The shortened hammock has unique end pads that extend over the cross-bar, making extension of a user's legs off the end of the hammock comfortable. This allows a user to keep her shoes on, or keep dirt, sand, snow, etc. out of her hammock.

Figure 2:
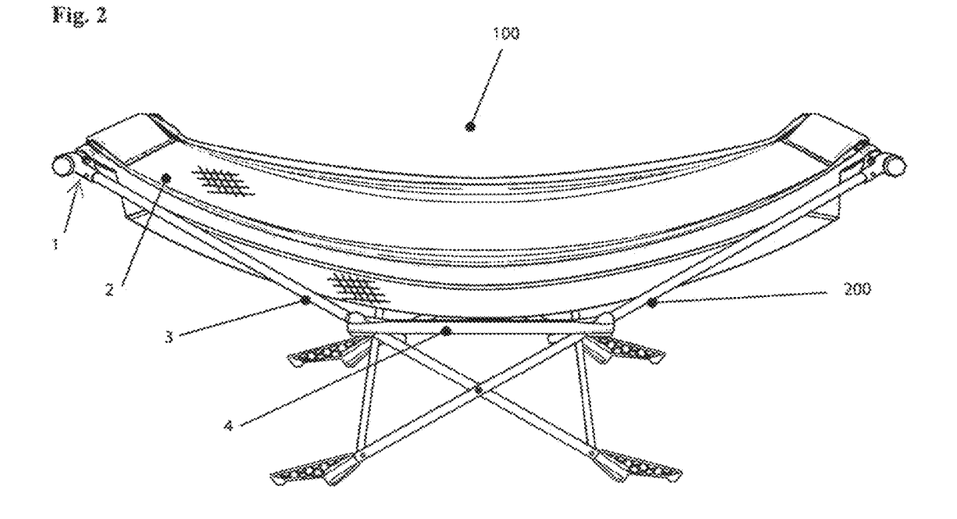
FIG. 2 is a front perspective view of an exemplary embodiment of the present invention.

FIG. 2 is a front perspective view of an exemplary embodiment of the present invention. In this embodiment, the self-standing hammock frame 100 has two identical and reflected sides 200. The sides are made up of frame tubes 3 that are configured in an "x" shape. When paired with the suspended hammock fabric, this "x" shape frame (structural frame) creates a balanced geometry, where the forces pulling the ends together through the hammock fabric pulling the ends "up" are in balanced equilibrium with the gravitational forces pulling the ends "down". End bar assemblies 1 connect the top ends of the frame tubes 3 and provide structural shape to the frame.

The frame tubes are held into a structural "x" shape through a flexible strap 4. Nonlimiting examples of flexible strap materials include webbing, cable, rope, etc. It could also be a hard material such as metal or plastic if hinged or otherwise foldable. The hammock fabric 2 is suspended between the end bars 1. The hammock fabric can be of any suitable material. Typically, it is high strength parachute nylon with triple stitched seams. The hammock fabric 2 is gathered along the end bar 1 shown in FIG. 6. In the embodiment shown in FIG. 2 the frame tubes are disassembled to fold down into its compact form in FIG. 5.

Figure 3:
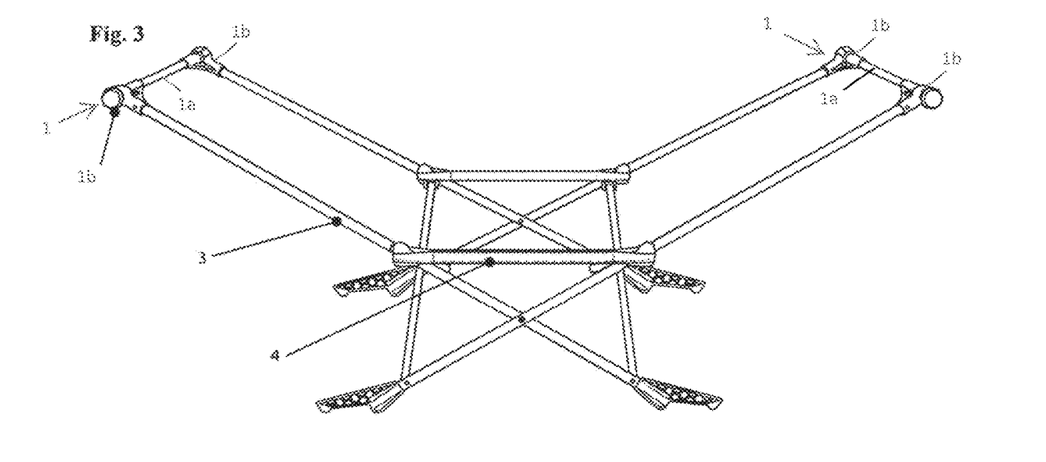
FIG. 3 is a front perspective view of an exemplary embodiment of the frame in the present invention, hammock fabric omitted.

FIG. 3 is a front perspective view of an exemplary embodiment of the frame in the present invention, hammock fabric omitted. This more clearly shows the end bar assemblies 1 connecting to the frame tubes 3. The flexible strap 4 connects the x-shaped frame tubes 3 together and provides the brace support to hold the x-shape structure. Each end bar assembly 1 includes an end bar 1a and opposing corner end caps 1b, which are more fully described herein in reference to FIGS. 16-18.

Figure 4:
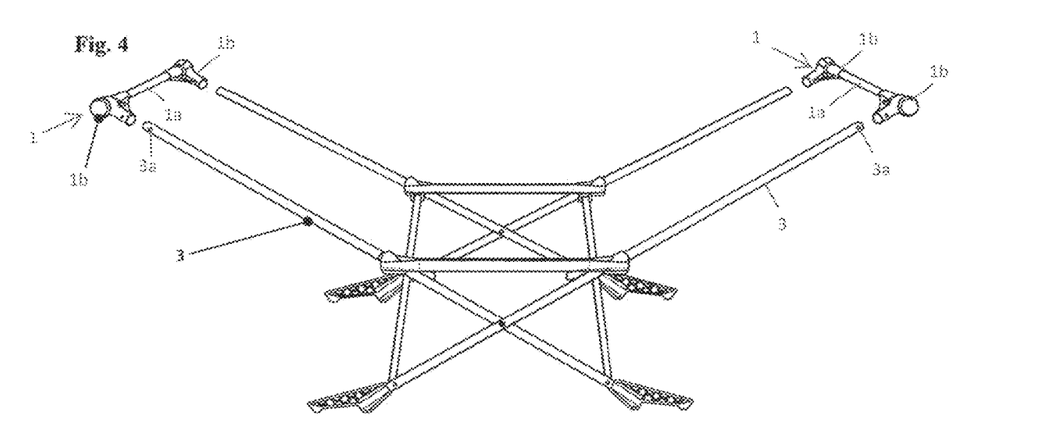
FIG. 4 is a front perspective view of the end bars disconnected from the frame.
Figure 5:
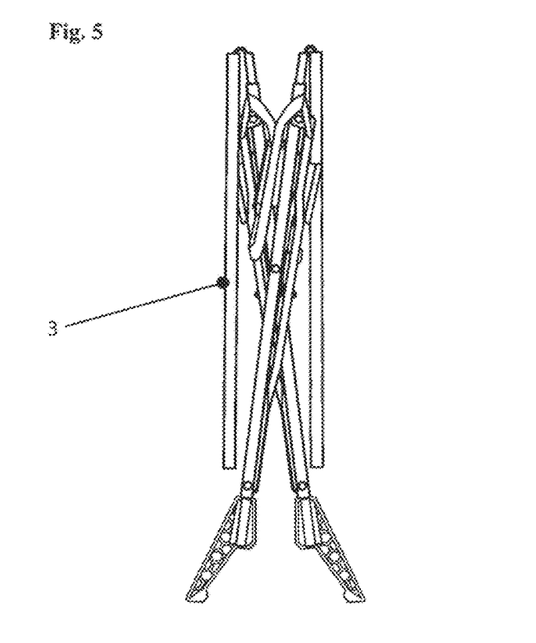
FIG. 5 is a front perspective view of the embodiment of FIG. 2 in its folded form.
Figure 19:
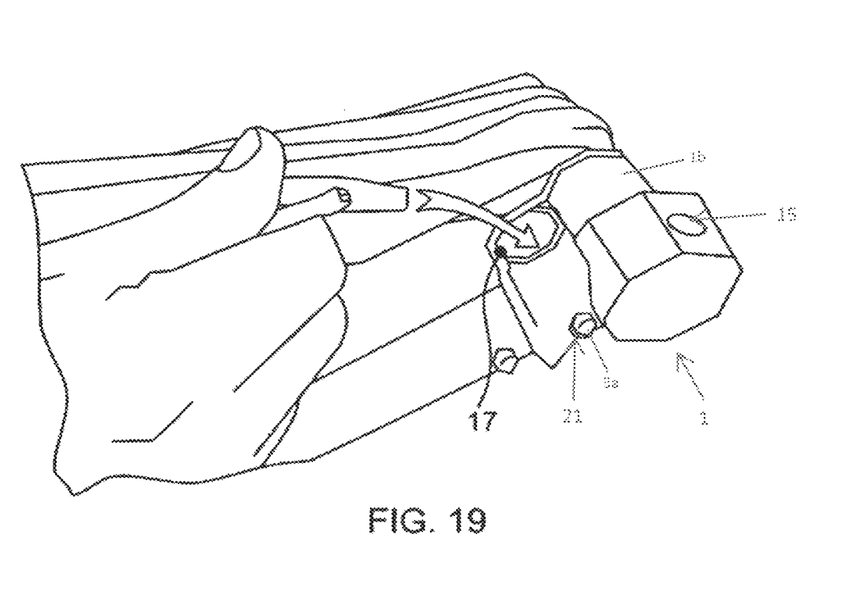
FIG. 19 is a front perspective view of the corner end cap part with the ring to connect accessories by a toggle or similar method.

FIG. 4 is a front perspective view of the end bars disconnected from the frame. As shown, end bar assemblies 1 are disconnected from the long frame tubes 3 by depressing frame tube pinlocks 3a, which are located on an outside of each frame tube 3, but is best seen in FIG. 19. This releases the structure of the self-standing frame and allows it to be folded up into its compact form as shown in FIG. 5.

Figure 6:
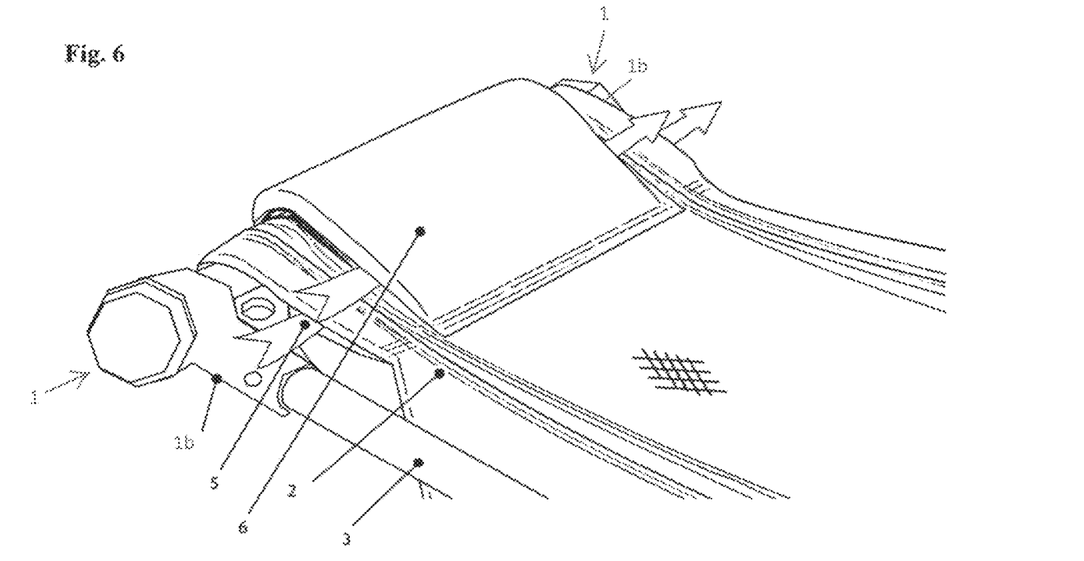
FIG. 6 is a front perspective view of the end bar, hammock fabric, and end pad.

FIG. 6 is a front perspective view of the end bar, hammock fabric, and end pad. A method for suspending the shortened hammock fabric 2 onto the hammock frame is illustrated. The end of the hammock fabric 2 is sewn to form a sleeve 5 that is slid onto the end bar 1a. The sleeve is typically loose enough to allow the fabric to slide freely along the end bar, and tight enough to be stopped from slipping over the end corners. Oftentimes a 3" loop is used. The hammock fabric 2 is gathered along the end bar 1a. Attached onto the hammock fabric 2 is a foam pad 6 covering the end bar 1a. The end pads are typically, permanently sewn onto the hammock fabric. In one case they are 11" wide, providing ample padding for the head and legs of the user. The end pads may extend over the end of the sleeve and loop back under the end bars sleeve to be secured back onto the hammock fabric.

The foam pad 6 is assembled onto the hammock fabric 2 so that there is a gap between the two materials. The gap between the end pads and the fabric sleeve is typically between 0.5 inches and 3.0 inches under application of weight. Oftentimes the gap is between 0.5 inches and 2.0 inches. In certain cases, the gap is approximately 1.0 inch. The end pads are usually held tight without compression. (Compression occurs when the fabric is pulled tight around the pad.) This gap typically allows the hammock fabric 2 to stretch between 0.5 inch and 3.0 inches, or between approximately 1.0 inch and approximately 2.5 inches (e.g., nylon fabric), but it may also be made of a non-stretch fabric (e.g., polyester). The amount of stretch is dependent on the material used as well as the weight applied. Any suitable weight can be applied. Nonlimiting examples of weight than can be applied include: at least 150 pounds; at least 200 pounds; at least 250 pounds; and at least 300 pounds.

Figure 7:
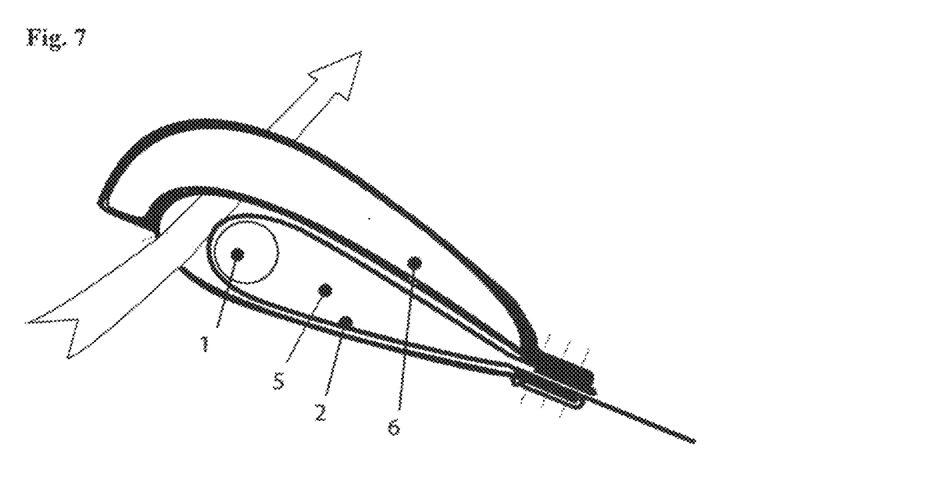
FIG. 7 is a cross sectional view of the end bar and end pad.

FIG. 7 is a cross sectional view of the end bar and end pad. It includes a cross section view of the hammock fabric 2, the end bar 1a, and the foam pad 6. The hammock fabric 2 is sewn into a sleeve that slides over the end bar 1a. The foam pad 6 is assembled onto the hammock fabric with a gap between the hammock fabric 2 and the foam pad 6.

Figure 8:
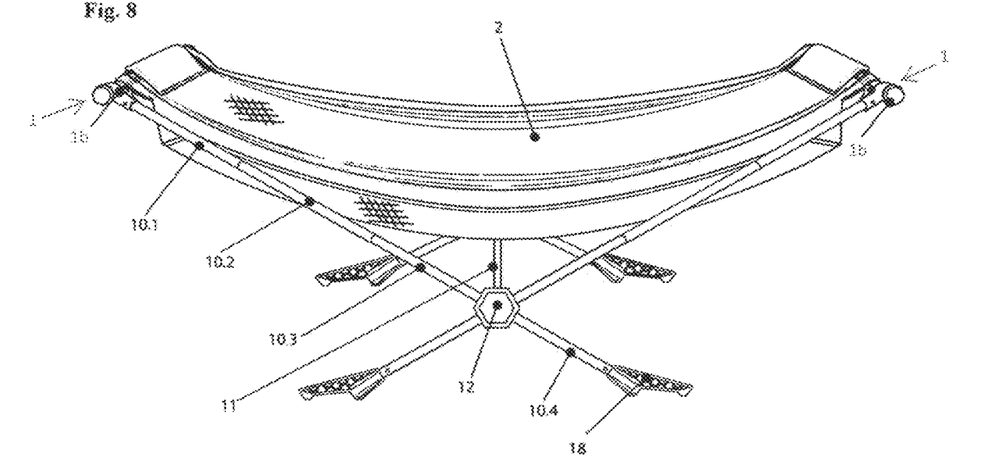
FIG. 8 is a front perspective view of a modified embodiment of the invention.
Figure 10:
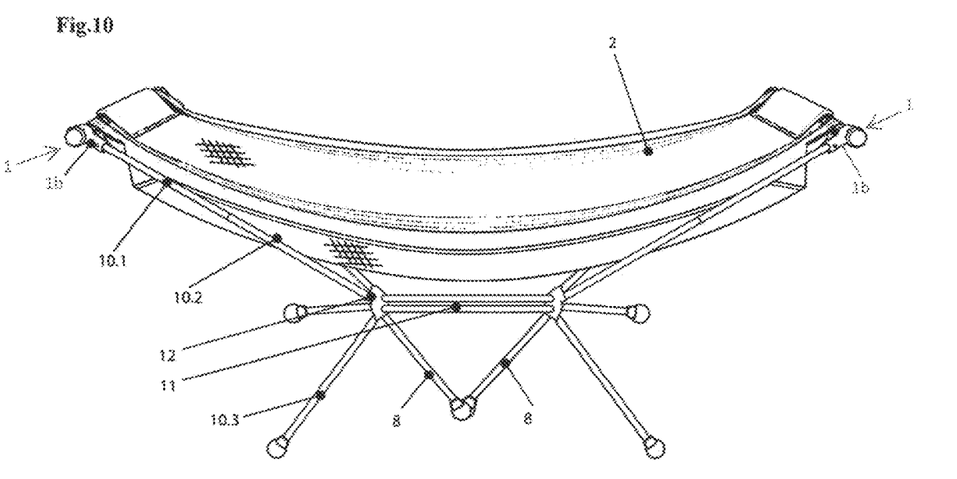
FIG. 10 is a front perspective view of the collapsed version of embodiments 8 and 9.

FIG. 8 is a front perspective view of a modified embodiment of the invention. An advantage of this embodiment is that it will collapse down to a more compact form. The frame tubes are separated into four lengths 10. The top length 10.1, middle upper length 10.2, and bottom upper length 10.3 are connected into the hub 12 and the lower leg length 10.4. A structural cross tube 11 connects the two hubs 12 together. The method for suspending the shortened hammock fabric 2 onto the frame is shown in FIG. 6 and FIG. 7. The frame tubes can be separated and collapsed down, remaining connected together and connected to the hubs 12 by means of an elastic cord 13 strung through the frame tubes, as shown in FIG. 10.

Figure 9:
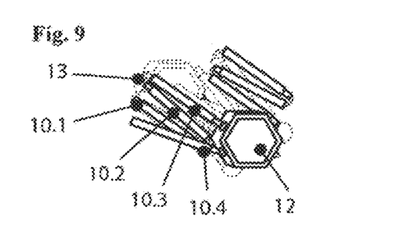
FIG. 9 is a front perspective view of a modified embodiment of the present invention.

FIG. 9 is a front perspective view of a modified embodiment of the present invention. As shown, this embodiment also collapses down into a more compact form. It is an "ultra-portable" model, utilizing high strength and super lightweight aluminum tubes and lightweight hammock fabric to make a lightweight, compact, and easily portable framed hammock that can fit into a standard backpack. In this embodiment the "x" shape structure is at the ends of the hammock fabric. This allows for a wider support base without the need for the bulky feet used on the main embodiment and FIG. 8. An additional leg tube 8 is shown, which provides a tri-pod like base for each end of the frame. A structural cross tube 11 connects the two hubs 12 together. The shortened hammock fabric 2 is suspended between the end bars 1a. The method for suspending the shortened hammock fabric 2 onto the frame is shown in FIG. 6 and FIG. 7.

Figure 11:
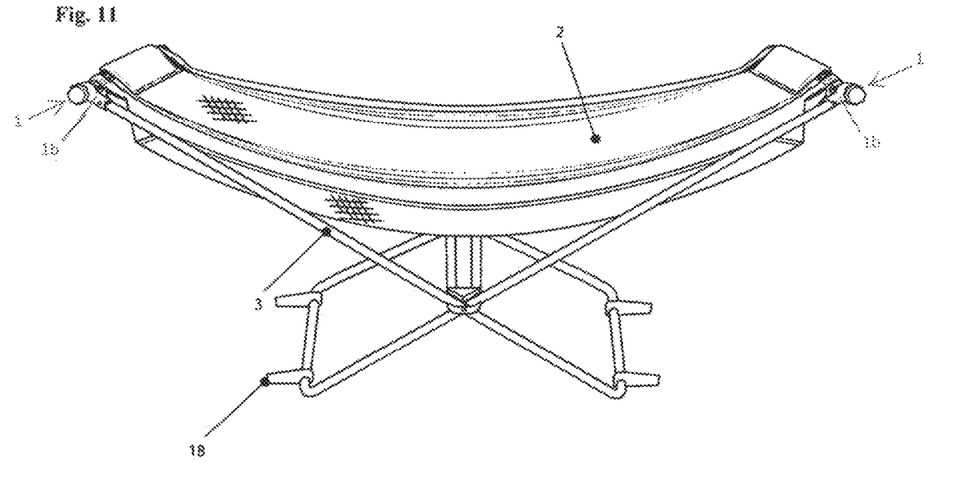
FIG. 11 is a front perspective view of a modified embodiment of the present invention.

FIG. 11 is a front perspective view of a modified embodiment of the present invention. As shown, an advantage of this embodiment is that it is a simple "single folding" frame for products that do not need to focus on compact storage, such as a patio version of the shortened hammock. This construction simply folds in half and stands up on its feet. It is easy to store out of the way on the deck or patio and to pull out and use whenever wanted. In this embodiment the "x" frames are connected at the base as well as by the top end bars. The shortened hammock fabric 2 is suspended between the end bars 1. The method for suspending the shortened hammock fabric 2 onto the frame is shown in FIG. 6 and FIG. 7.

Figure 12:
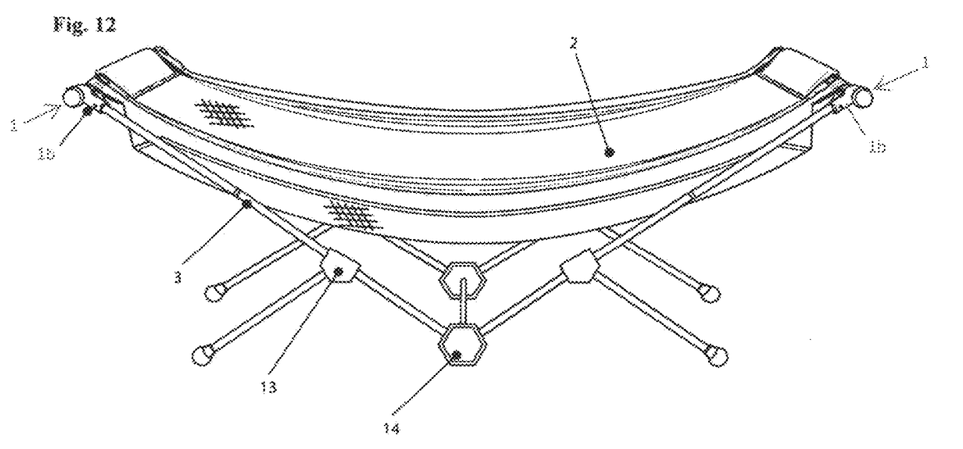
FIG. 12 is a front perspective view of a modified embodiment of the present invention.

FIG. 12 is a front perspective view of a modified embodiment of the present invention. As shown, an advantage of this embodiment is that it allows the hammock to be lower to the ground, like a cot or bed. The structural "x" shape has been modified into a "v" shape (structural frame) base hub 14, and two leg hubs 13 distributed along the frame tubes 3. This allows the hammock lounger to be lower and closer to the ground.

Figure 13:
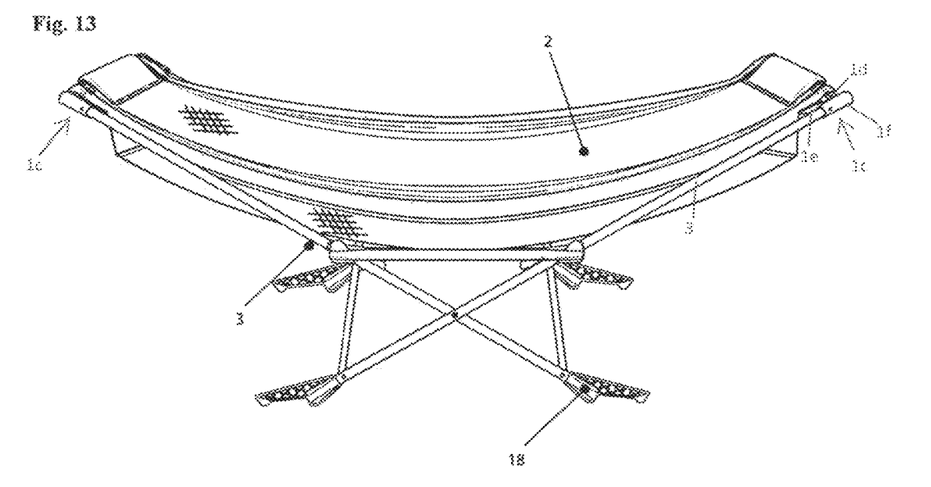
FIG. 13 is a front perspective view of a modified embodiment of the present invention.

FIG. 13 is a front perspective view of a modified embodiment of the present invention. As shown, an advantage of this design is that a modified end bar assembly includes 1c a webbing or flexible member 1d rather than a firm bar. This embodiment can provide extra comfort for the head and legs of a user. Each modified end bar assembly 1c consists of a bent frame bar 1e underneath the webbing or other flexible member 1d spanning between the ends of the frame tubes 3. The hammock fabric is assembled onto the webbing or other flexible member utilizing the method for suspending the shortened hammock fabric 2 onto the frame shown in FIG. 6 and FIG. 7.

Figure 14:
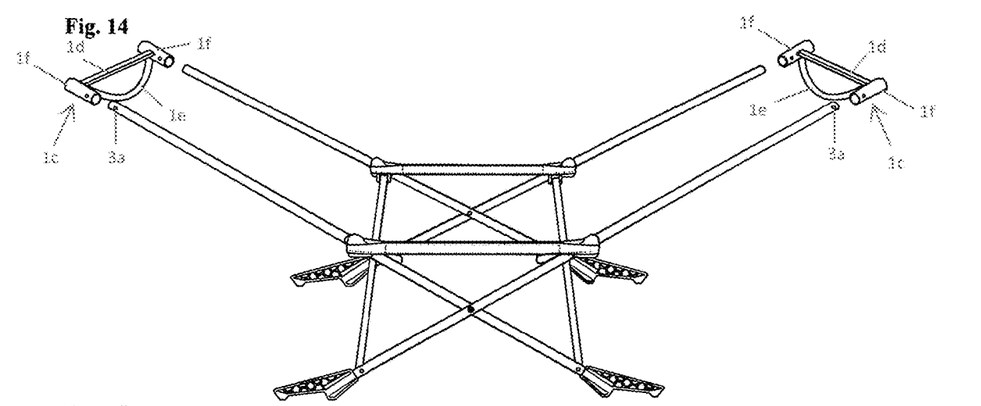
FIG. 14 is the front perspective view of the embodiment in FIG. 13, with the hammock fabric removed to more clearly see the end bars.

FIG. 14 is a front perspective view of the embodiment in FIG. 13, with the hammock fabric 2 removed to show the structure of the modified end bar assemblies 1c.

Figure 15:
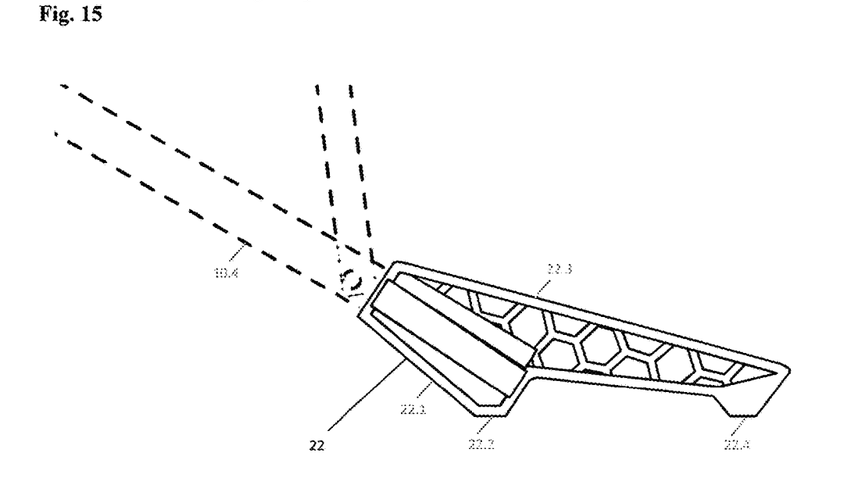
FIG. 15 is a front view of the extended foot.

FIG. 15 is a front view of the extended foot 22, that extends the points of ground contact out wide, to provide bracing and additional support. These are much like the outriggers used on trucks and trailers. The extended foot 22 includes a connector portion 22.1 connected to a body portion 22.3. The connector portion 22.1 includes a first flat portion 22.2 on a bottom of the connector portion 22.1 and the body portion 22.3 includes a second flat portion 22.4 on a bottom of the body portion 22.3. The extended foot 22 creates a wider base and more support beyond the contact points of the frame.

Figure 16:
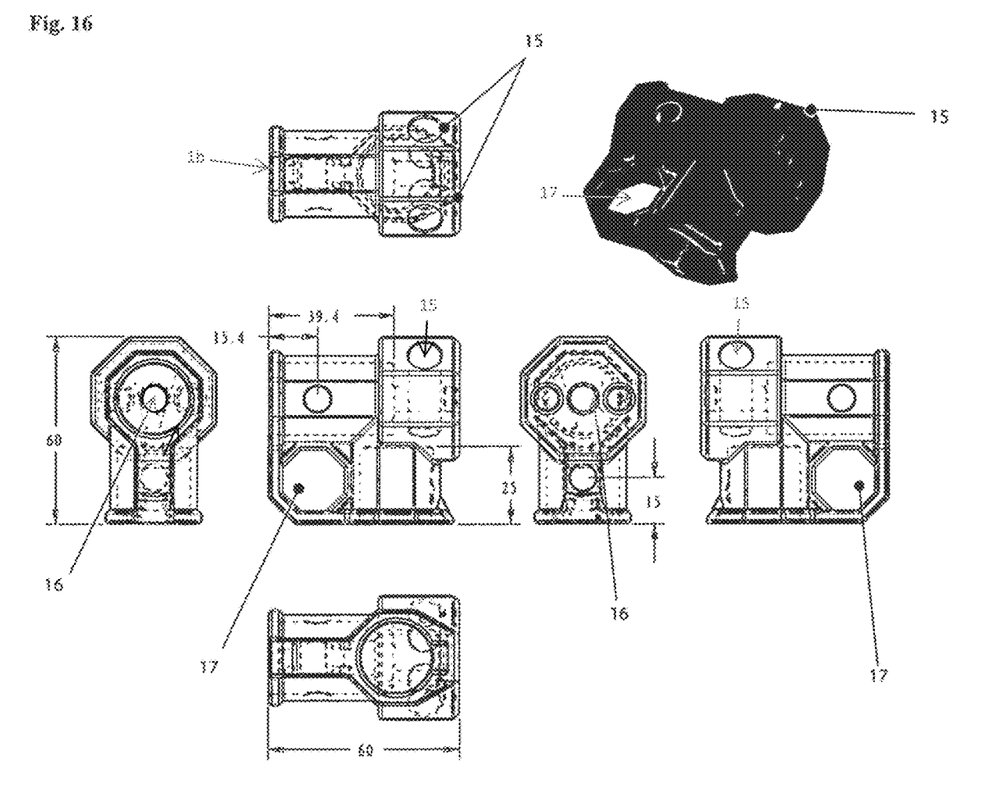
FIG. 16 is a set of views of the corner end cap part.

FIG. 16 is various views of the corner end cap 1b, showing sockets that allow additional frame parts to be assembled onto the self-standing frame. The corner end cap 1b includes frame extension sockets 15 that fit fiberglass, aluminum, or other frame poles. The corner end cap 1b oftentimes includes a bolt-on socket 16 to allow a screw bolt to attach additional items onto the self-standing frame. The corner end cap 1b may also include a ring 17 or similar method to attach a toggle, string, or other item onto the corner end cap 1b and frame 3.

Figure 17:
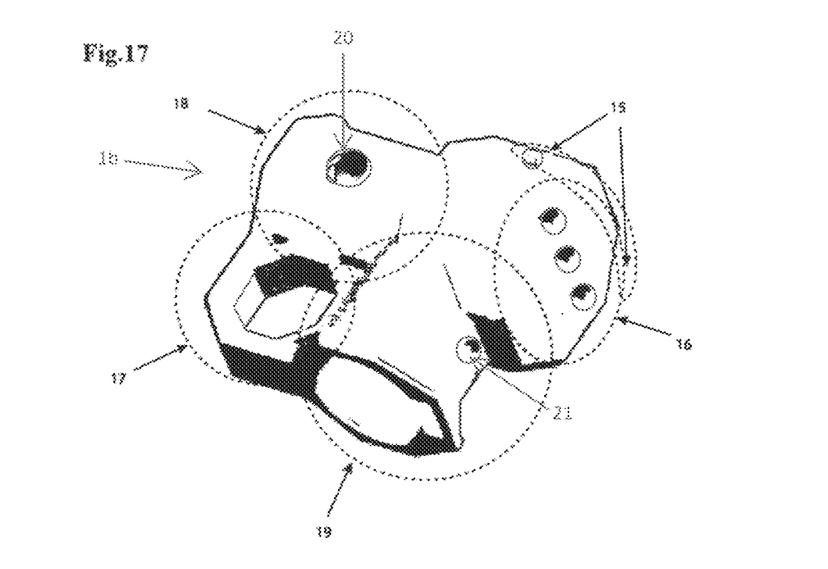
FIG. 17 is a front perspective view of the corner end cap part, with circles indicating the functional areas of the part.

FIG. 17 is a front perspective view of the corner end cap 1b. The corner end cap 1b may have the following connected sections: the end bar receiving socket 18, the ring 17, a frame tube receiving socket 19, an end bar receiving socket pinlock hole 20, a frame tube receiving socket pinlock hole 21, the bolt-on socket 16, and the frame extension sockets 15.

Figure 18:
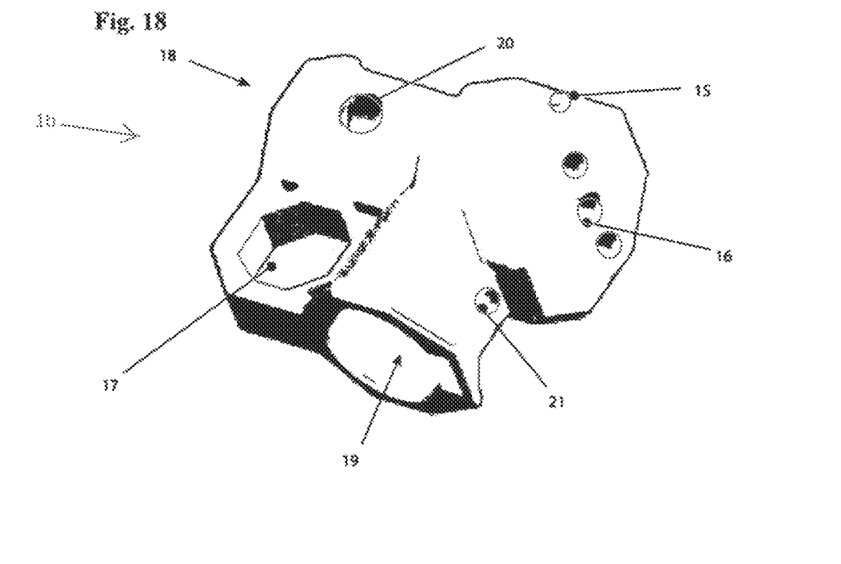
FIG. 18 is a front perspective view of the corner end cap part showing the functional features specifically applied to the part.

FIG. 18 is a front perspective view of one embodiment of the corner end cap 1b, showing holes that allow the frame to secure together with pinlocks. The end bar 1a is inserted into the end bar receiving socket 18 and is locked in place with an end bar pinlock (not shown) that secures into the end bar receiving socket pinlock hole 20. The frame tube 3 is inserted into the frame tube receiving socket 19, and is locked in place with a frame pinlock 3a, which is best seen in FIG. 19 and, that secures into the frame tube receiving socket pinlock hole 21.

FIG. 19 is a front perspective view of the corner end caps showing detail of the ring 17 to attach a toggle (shown), or similar method.

Figure 20:
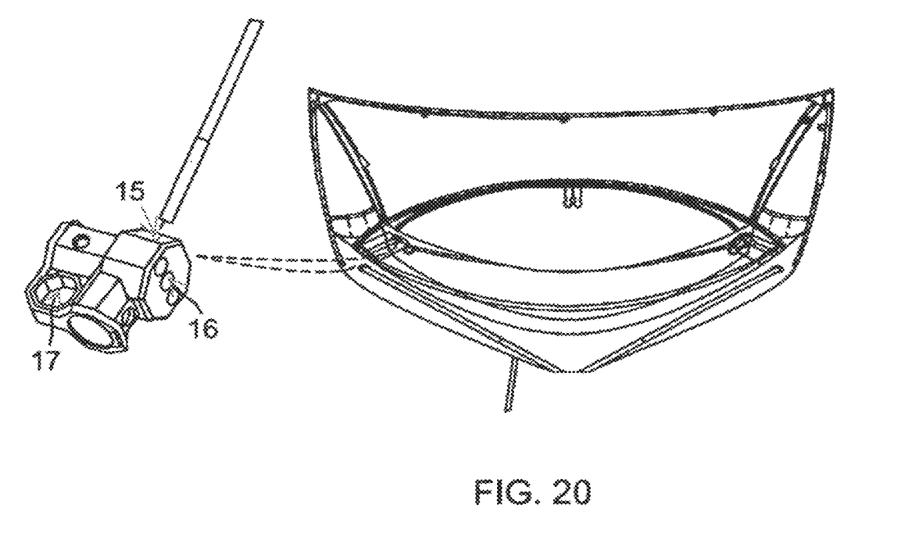
FIG. 20 is a front perspective view of the corner end cap part in use holding the frame for a bug net accessory.

FIG. 20 is a front perspective view of the corner end caps in use, shown with frame extension poles 23 assembled onto the frame extension sockets 15 to extend the frame to allow additional accessories to be assembled onto the frame. These accessories can be and are not limited to bug enclosures 24, sun coverage tarps or shades, rain protection tarps, privacy walls, flags, banners, camp accessory racks, and table surfaces. The present invention incorporates the frame extension poles 23 into one embodiment of a bug enclosure 24 and one embodiment of a sun/rain/privacy tarp 26.

Figure 21:
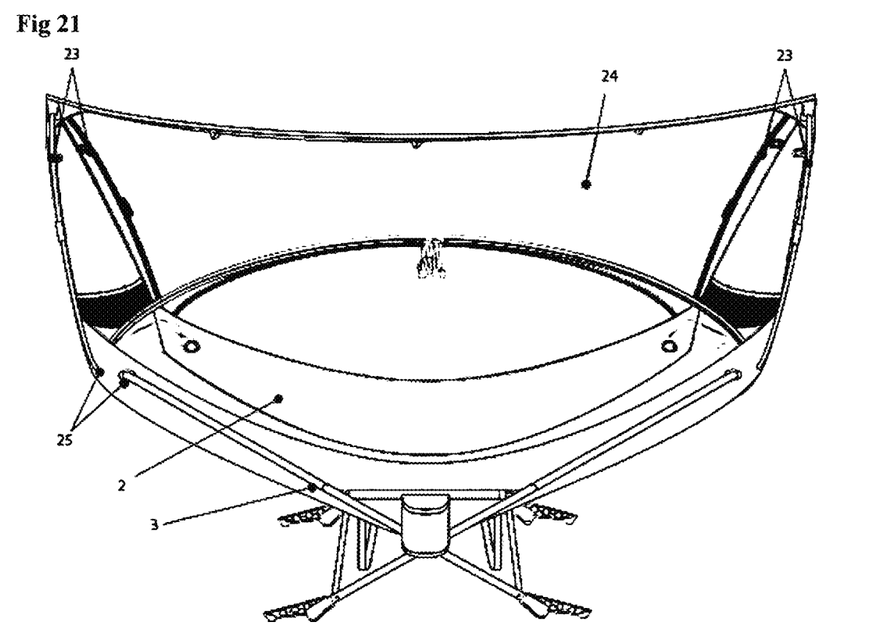
FIG. 21 is a front perspective view of the frame with one embodiment of the bug net attached.

FIG. 21 is a front perspective view of the one embodiment of the bug enclosure 24, showing how the frame tubes 3, and the frame extension poles 23 pass through gasket holes 25 in the bug enclosure. This allows the frame tubes 3 to pass from outside to inside of the enclosure, where they can connect to the end bar assemblies 1 that connect the frame together and holds the hammock fabric 2.

Figure 22:
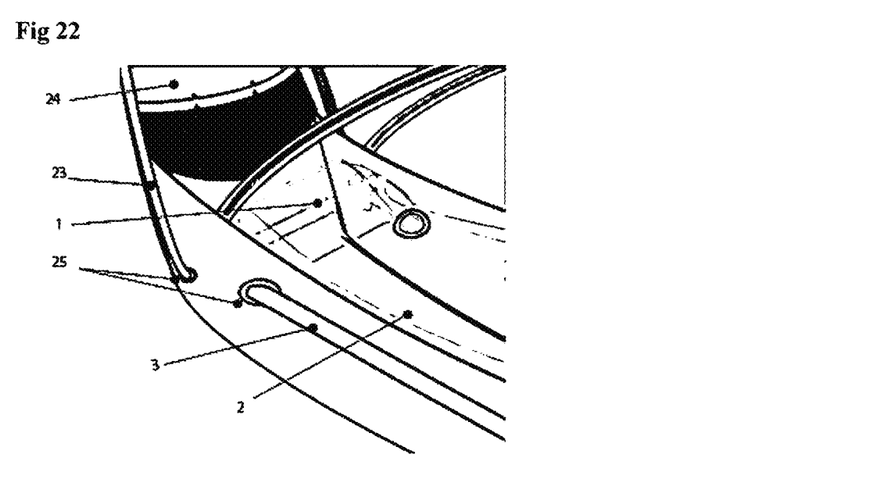
FIG. 22 is a detail perspective view of the method that the bug net allows the frame to pass from outside to inside of the bug net.

FIG. 22 is a detail view of the embodiment of FIG. 21.

Figure 23:
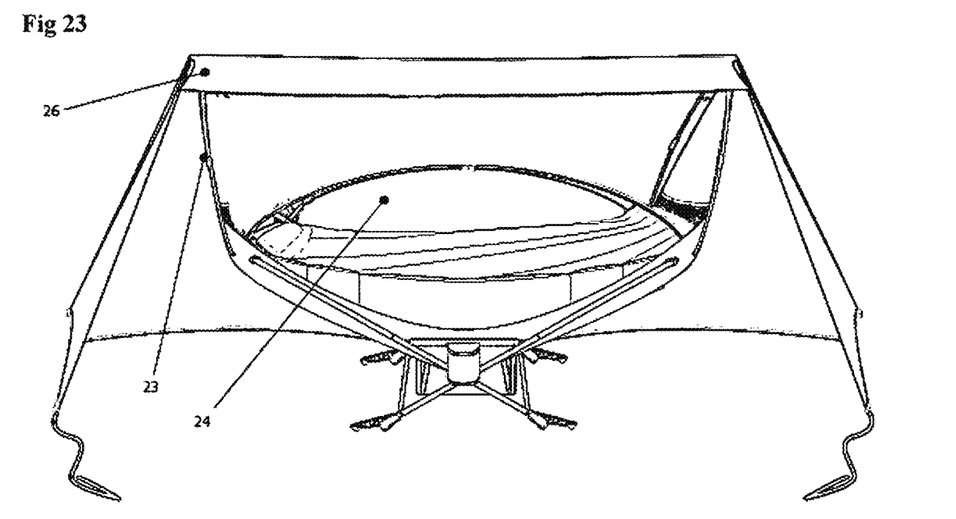
FIG. 23 is a front perspective view of the bug net with the rain tarp connected.

FIG. 23 is a front perspective view of another embodiment of accessory that attaches to the frame by use of the frame extension sockets 15 in the corner end parts. This embodiment is a sun/rain/privacy tarp 26 that attach to the frame extension poles 23. In this embodiment, the tarp 26, sun shade 27, bug enclosure 24, under and over quilts can all be attached to the receiving sockets in the corner end caps independently or in any combination.

Figure 24:
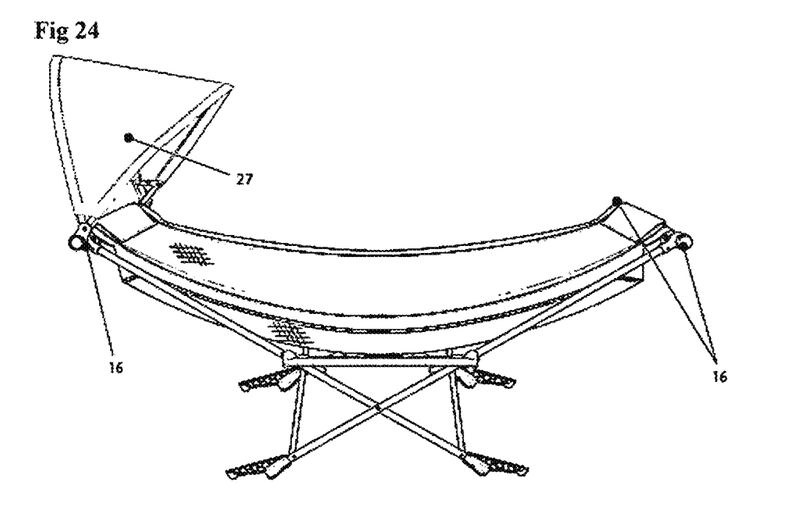
FIG. 24 is a front perspective view of an embodiment of accessory that attaches to the frame.

FIG. 24 is a front perspective view of an embodiment of accessory that attaches to the frame through the bolt-on socket 16, a foldable sun shade 27.

What is claimed is:

1. A corner end cap for a self-standing frame for a hammock, the corner end cap comprising:
   at least one frame tube receiving socket;
   at least one socket formed in an end surface of the corner end cap that allows a screw bolt to attach additional items onto the self-standing frame;
   a plurality of frame extension sockets formed in a plurality of non-contiguous outside surfaces of an octagonal-shaped end of an end bar receiving socket where the plurality of non-contiguous outside surfaces of the octagonal-shaped end of the end bar receiving socket are substantially orthogonal to the end surface of the end bar receiving socket and an axis of each of the frame extension sockets are substantially orthogonal to each other; and
   a means to attach a toggle, a string or an other item to the corner end cap and hammock frame.

2. The corner end cap of claim 1, the attachment means comprises a ring configured to attach the toggle, the string or the other item to the corner end cap and hammock frame.

3. The corner end cap of claim 1, wherein the corner end cap further comprises an end bar receiving socket.

4. The corner end cap of claim 3, wherein the end bar receiving socket further comprises an end bar receiving socket pinlock hole configured to receive an end bar pinlock.

5. The corner end cap of claim 1, wherein the at least one frame tube receiving socket comprises a single frame tube receiving socket including a frame tube receiving socket pinlock hole configured to receive a frame bar pinlock.

6. The corner end cap of claim 1, wherein the plurality of frame extension sockets are each configured to receive other frame poles.

7. A corner end cap comprising:
   a frame tube receiving socket;
   an end bar receiving socket connected to the frame tube receiving socket at a substantially orthogonal angle and where the end bar receiving socket includes a socket formed in an end surface of the corner end cap and the socket being configured to receive a screw bolt to affix additional items to the corner end cap;
   a plurality of frame extension sockets formed in a plurality of non-contiguous outside surfaces of an octagonal-shaped end of the end bar receiving socket where the plurality of non-contiguous outside surfaces of the octagonal-shaped end of the end bar receiving socket are substantially orthogonal to the end surface of the end bar receiving socket and an axis of each of the frame extension sockets are substantially orthogonal to each other; and
   a ring connected on a first edge to an outside surface of the frame tube receiving socket and connected on an adjacent second edge to an outside surface of the end bar receiving socket.

8. The corner end cap of claim 7, wherein the frame tube receiving socket further comprises a frame tube receiving socket pinlock hole.

9. The corner end cap of claim 8, wherein the frame tube receiving socket pinlock hole is configured to removably receive a frame tube pinlock.

10. The corner end cap of claim 7, wherein the end bar receiving socket further comprises an end bar receiving socket pinlock hole.

11. The corner end cap of claim 10, wherein the end bar receiving socket pinlock hole is configured to removably receive an end bar pinlock.

12. The corner end cap of claim 7, wherein the ring is configured to be attached to a toggle, a string or an other item.

13. A corner end cap comprising:
   a frame tube receiving socket;
   an end bar receiving socket connected to the frame tube receiving socket at a substantially orthogonal angle;
   a plurality of frame extension sockets formed in a plurality of non-contiguous outside surfaces of an octagonal-shaped end of the end bar receiving socket that where the plurality of non-contiguous outside surfaces of the octagonal-shaped end of the end bar receiving socket are substantially orthogonal to an end surface of the end bar receiving socket of the end bar receiving socket and an axis of each of the frame extension sockets are substantially orthogonal to each other, the end surface having a plurality of sockets formed therein; and
   a ring connected on a first edge to an outside surface of the frame tube receiving socket and connected on an adjacent second edge to an outside surface of the end bar receiving socket.

14. The corner end cap of claim 13, wherein the frame tube receiving socket further comprises a frame tube receiving socket pinlock hole.

15. The corner end cap of claim 14, wherein the frame tube receiving socket pinlock hole is configured to removably receive a frame tube pinlock.

16. The corner end cap of claim 15, wherein the end bar receiving socket further comprises an end bar receiving socket pinlock hole.

17. The corner end cap of claim 16, wherein the end bar receiving socket pinlock hole is configured to removably receive an end bar pinlock.

18. The corner end cap of claim 17, wherein the ring is configured to be attached to a toggle, a string or an other item.

19. The corner end cap of claim 18, wherein the end bar receiving socket includes a socket configured to receive a screw bolt to affix additional items to the corner end cap.

\* \* \* \* \*